(12) United States Patent
Shimada et al.

(10) Patent No.: US 9,426,353 B2
(45) Date of Patent: Aug. 23, 2016

(54) AUTO FOCUS CONTROL OF IMAGE CAPTURING APPARATUS

(71) Applicant: SONY CORPORATION, Tokyo (JP)

(72) Inventors: Junji Shimada, Tokyo (JP); Hitoshi Ueda, Tokyo (JP); Takashi Kawai, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/601,539

(22) Filed: Jan. 21, 2015

(65) Prior Publication Data

US 2015/0215521 A1 Jul. 30, 2015

(30) Foreign Application Priority Data

Jan. 30, 2014 (JP) .................................. 2014-015820

(51) Int. Cl.
*H04N 5/232* (2006.01)
(52) U.S. Cl.
CPC ................................. *H04N 5/23212* (2013.01)
(58) Field of Classification Search
CPC .......................... H04N 5/232; H04N 5/23212
See application file for complete search history.

(56) References Cited

U.S. PATENT DOCUMENTS

| 6,882,369 | B1 * | 4/2005 | Ito | H04N 5/23293 348/333.01 |
| 7,711,260 | B2 * | 5/2010 | Ide | G02B 7/34 250/201.7 |
| 2002/0171750 | A1 * | 11/2002 | Kato | H04N 5/2254 348/345 |
| 2004/0155976 | A1 * | 8/2004 | Suda | G03B 13/36 348/345 |
| 2009/0185069 | A1 * | 7/2009 | Aoyama | H04N 5/23212 348/346 |
| 2010/0208117 | A1 * | 8/2010 | Shintani | H04N 5/23209 348/311 |
| 2011/0304765 | A1 * | 12/2011 | Yogo | G02B 7/34 348/345 |
| 2013/0010179 | A1 * | 1/2013 | Takahara | G02B 7/36 348/353 |
| 2013/0113983 | A1 * | 5/2013 | Yumiki | G02B 7/102 348/345 |
| 2014/0071318 | A1 * | 3/2014 | Akamatsu | H04N 5/23212 348/294 |

FOREIGN PATENT DOCUMENTS

JP 2008-129255 A 6/2008
JP 2013-050690 A 3/2013

* cited by examiner

*Primary Examiner* — Amy Hsu
(74) *Attorney, Agent, or Firm* — Chip Law Group

(57) ABSTRACT

An image capturing apparatus includes: a system selector configured to select either one of a focus control of a contrast system in which a wobbling motion is performed for detection and a focus control of a different system that is different from the focus control of the contrast system; and a controller configured to set a first wobbling amount for the focus control of the different system to be smaller than a second wobbling amount for the focus control of the contrast system.

14 Claims, 3 Drawing Sheets

AUTO FOCUS CONTROL OF IMAGE CAPTURING APPARATUS

CROSS REFERENCE TO RELATED APPLICATIONS

This application claims the benefit of Japanese Priority Patent Application JP 2014-015820 filed Jan. 30, 2014, the entire contents of which are incorporated herein by reference.

BACKGROUND

The present technology relates to an auto focus control of an image capturing apparatus.

SUMMARY

From the past, a contrast system is known as an auto focus (hereinafter, also simply referred to as AF) system performed in capturing an image. In the contrast system, the focus control is performed based on a contrast evaluation value obtained from a captured image. In particular, in the contrast system, it is general to use a focus system called wobbling mode in which a position of a destination of a focus lens is calculated while finely vibrating the focus lens. Finely vibrating the focus lens in this manner is called wobbling.

However, in auto focus on the wobbling mode, the focus lens is finely vibrated when contrasts are detected, and hence the image quality can be deteriorated. In view of this, a technique of detecting, in the auto focus control on the wobbling mode, a panning operation or zooming operation by a user and changing a wobbling amount based on a detection result thereof, to thereby suppress the deterioration of the image quality (for example, see Japanese Patent Application Laid-open No. 2008-129255).

By the way, there has been also proposed a hybrid AF system in which the focus control is performed by combining various auto focus systems as the auto focus system. For example, as the hybrid AF system, there is also known a system combining the contrast system and an image plane phase difference system.

In such a hybrid AF system, it is desirable to realize a high image quality in addition to high-speed AF control. The present technology has been made in view of this situation to provide a higher quality image.

According to an embodiment of the present technology, there is provided an image capturing apparatus, including: a system selector configured to select either one of a focus control of a contrast system in which a wobbling motion is performed for detection and a focus control of a different system that is different from the focus control of the contrast system; and a controller configured to set a first wobbling amount for the focus control of the different system to be smaller than a second wobbling amount for the focus control of the contrast system.

The focus control of the different system may need no wobbling motion for detection.

The focus control of the different system may be a focus control of a phase difference system.

The selector may be configured to select, based on a result of detection for the focus control of the phase difference system, either one of the focus control of the contrast system and the focus control of the phase difference system.

The selector may be configured to perform the focus control of the phase difference system if a defocus amount as the result of detection is larger than a threshold.

The controller may be configured to calculate the first wobbling amount and the second wobbling amount such that the first wobbling amount is smaller than the second wobbling amount. The first wobbling amount and the second wobbling amount may take values set in advance.

The focus control of the phase difference system may be a focus control of an image plane phase difference system.

According to another embodiment of the present technology, there is provided a method of controlling an image capturing apparatus, including the steps of: selecting either one of a focus control of a contrast system in which a wobbling motion is performed for detection and a focus control of a different system that is different from the focus control of the contrast system; and setting a first wobbling amount for the focus control of the different system to be smaller than a second wobbling amount for the focus control of the contrast system.

The focus control of the different system may need no wobbling motion for detection.

The focus control of the different system may be a focus control of a phase difference system.

The selecting step may include selecting, based on a result of detection for the focus control of the phase difference system, either one of the focus control of the contrast system and the focus control of the phase difference system.

The selecting step may include performing the focus control of the phase difference system if a defocus amount as the result of detection is larger than a threshold.

The setting step may include calculating the first wobbling amount and the second wobbling amount such that the first wobbling amount is smaller than the second wobbling amount.

The first wobbling amount and the second wobbling amount may take values set in advance.

The focus control of the phase difference system may be a focus control of an image plane phase difference system.

According to still another embodiment of the present technology, there is provided a non-transitory computer readable medium storing a program causing a computer to execute a method of controlling an image capturing apparatus, the method including the steps of: selecting either one of a focus control of a contrast system in which a wobbling motion is performed for detection and a focus control of a different system that is different from the focus control of the contrast system; and setting a first wobbling amount for the focus control of the different system to be smaller than a second wobbling amount for the focus control of the contrast system.

The focus control of the different system may need no wobbling motion for detection.

The focus control of the different system may be a focus control of a phase difference system.

The selecting step may include selecting, based on a result of detection for the focus control of the phase difference system, either one of the focus control of the contrast system and the focus control of the phase difference system.

According to an embodiment of the present technology, a higher quality image can be obtained.

It should be noted that the effects described here are not necessarily limited and any effect described in the present disclosure may be provided.

These and other objects, features and advantages of the present disclosure will become more apparent in light of the following detailed description of best mode embodiments thereof, as illustrated in the accompanying drawings.

DETAILED DESCRIPTION OF EMBODIMENTS

Figure 1:
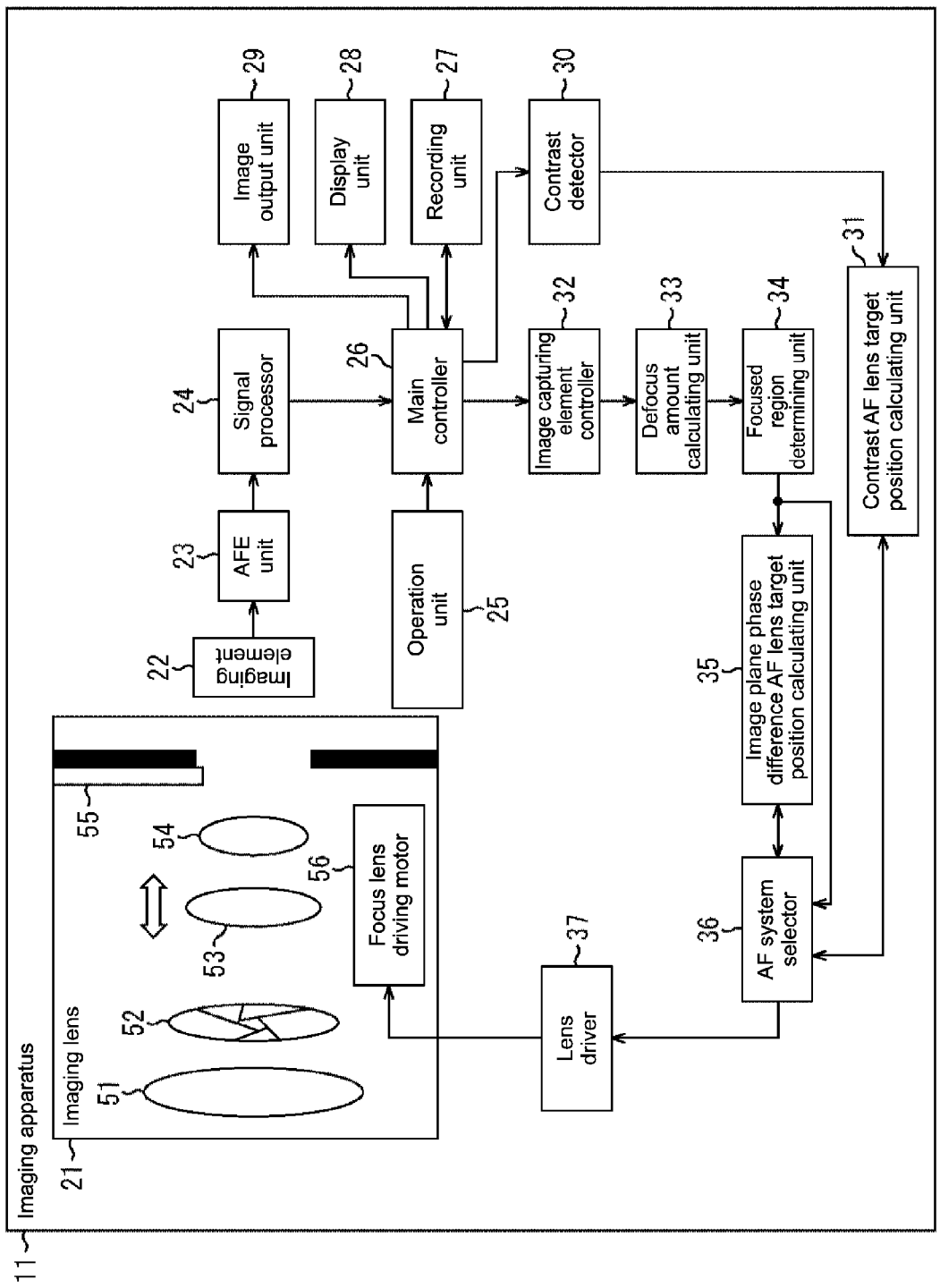
FIG. 1 is a view showing a configuration example of an image capturing apparatus.

Preceding to descriptions of the present technology, a hybrid AF system combining a contrast system and an image plane phase difference system will be described.

In the hybrid AF system, the focus control is performed by the image plane phase difference system in some cases and the focus control is performed by the contrast system in other cases. In this case, while the focus control is being performed, the calculation of the image plane phase difference system and the calculation of the contrast system are constantly performed in parallel for calculating a focus position.

In this case, contrasts are detected while adding fine vibrations to the focus lens, the focus lens is moved in a direction in which a contrast evaluation value obtained by the detection becomes maximum, and thus the focus position is searched.

Further, in the image plane phase difference system, in which region of an image the focus is to be achieved on a subject is judged based on defocus amounts obtained from outputs of phase difference detection pixels provided in an image capturing element. Then, the focus position, that is, the destination of the focus lens is calculated based on the defocus amount of the determined region. Here, the defocus amount is a deviation amount of an image plane at the current point of time to a predetermined focal plane indicating a target focus position.

In the above-mentioned hybrid AF system, the calculation of the contrast system, that is, the contrast detection is performed also while an auto focus control of the image plane phase difference system is being performed. In this case, fine vibrations are constantly added to the focus lens. Therefore, in the image plane phase difference system, the focus position is searched in a state in which the deviation amount of the image plane to the predetermined focal plane, that is, the defocus amount is constantly changed, and hence the focusing accuracy is deteriorated.

In such a case, an image is captured in a slightly defocused state and the resulting image quality can be deteriorated. Thus, it is sometimes difficult to obtain a focused high-quality image.

Hereinafter, embodiments to which the present technology is applied will be described with reference to the drawings.

<First Embodiment>
<Configuration Example of Image Capturing Apparatus>

The present technology enables a higher quality image to be obtained in a hybrid AF system in which an auto focus control is performed by combining a contrast system of searching for a focus position while performing wobbling and another auto focus system of searching for a focus position without wobbling.

The auto focus system combined with the contrast system may be any system such as an active system as long as it is a system not needing wobbling during detection. Hereinafter, a hybrid AF system combining an image plane phase difference system and a contrast system will be described as an example.

In such a hybrid AF system, during image capturing, wobbling is performed for detection of the contrast system also while the auto focus control of the image plane phase difference system is being performed. That is, the detection of the contrast system is continuously performed during image capturing. In view of this, in the present technology, while the auto focus control of the image plane phase difference system is being performed, a wobbling amount, that is, an amplitude for finely vibrating a lens is set to be smaller than that while the auto focus control of the contrast system is being performed.

With this, a change in the defocus amount used in the image plane phase difference system becomes smaller, and it is possible to improve the focusing accuracy of the image plane phase difference system and provide a better-focused high-quality image. Further, wobbling influence, that is, vibration of the screen becomes less outstanding in the image obtained by image capturing, and hence it is possible not only to improve the image quality but also to improve the focusing accuracy.

Hereinafter, specific embodiments to which the present technology is applied will be described.

FIG. 1 is a view showing a configuration example of an embodiment of an image capturing apparatus to which the present technology is applied.

An image capturing apparatus 11 is, for example, a digital still camera or digital video camera having an image capturing function.

The image capturing apparatus 11 shown in FIG. 1 includes an image capturing lens 21, an image capturing element 22, an AFE (Analog Front End) unit 23, a signal processor 24, an operation unit 25, a main controller 26, a recording unit 27, a display unit 28, an image output unit 29, a contrast detector 30, a contrast AF lens target position calculating unit 31, an image capturing element controller 32, a defocus amount calculating unit 33, a focused region determining unit 34, an image plane phase difference AF lens target position calculating unit 35, an AF system selector 36, and a lens driver 37.

The image capturing lens 21 is formed of a plurality of lenses or the like. The image capturing lens 21 collects light input from a subject and guides the light to an image capturing surface of the image capturing element 22.

The image capturing lens 21 includes a lens 51, a diaphragm 52, a focus lens 53, a zoom lens 54, a shutter 55, and a focus lens driving motor 56. In particular, the lens 51, the focus lens 53, and the zoom lens 54 constitute an image capturing optical system of the image capturing lens 21. Alternatively, the focus lens 53 may be formed of a single lens or may be formed of a plurality of lenses.

The light input from the subject enters the image capturing element 22 through the lens 51, the diaphragm 52, the focus lens 53, the zoom lens 54, and the shutter 55. The shutter 55 is opened and closed under the control of, for example, the main controller 26 for exposing the image capturing element 22 to light.

The focus lens driving motor 56 is driven by the lens driver 37 and moves the focus lens 53 in an optical axis direction of the image capturing optical system, to thereby focus the focus lens 53 on the subject. That is, focus adjustment is performed. In addition, the focus lens driving motor 56 adds periodic fine vibrations to the focus lens 53 under the control of the lens driver 37. That is, wobbling is performed.

The image capturing element 22 is formed of a CMOS (Complementary Metal Oxide Semiconductor) image sensor, a CCD (Charge Coupled Device), or the like including an image capturing surface in which pixels are arranged in a matrix form. The image capturing element 22 receives, on the image capturing surface, the light input from the subject via the image capturing lens 21. The image capturing element 22 supplies, to the AFE unit 23, an image obtained by photoelectrically converting light from the subject.

Here, the image capturing surface of the image capturing element 22 is provided with image capturing pixels for capturing an image of a subject as an observation target and phase difference detection pixels for detecting a phase difference between light images of the subject. The phase difference detection pixels are used for auto focus of the image plane phase difference system. In particular, the phase difference detection pixels are discretely arranged among the image capturing pixels in the image capturing surface.

More specifically, some AF calculation regions are provided in the image capturing surface of the image capturing element 22 and a plurality of phase difference detection pixels are arranged in the AF calculation region. The AF calculation region is a candidate of a region as a target on which the focus is achieved (hereinafter, referred to as focus target region) and also generally called AF point.

For example, assuming that a pupil region of the image capturing lens 21 is divided into two left and right division regions, there are, in the AF calculation region, provided phase difference detection pixels that receive a luminous flux input from one division region and phase difference detection pixels that receive a luminous flux input from the other division region.

At the subsequent stage, with respect to each AF calculation region, a defocus amount is calculated based on the image of the subject in each division region, that is, a phase difference between the pupil-divided images (distance between images), which is obtained from pixel signals output from the phase difference detection pixels (hereinafter, also referred to as phase difference detection signals). Processing of detecting the phase difference and calculating the defocus amount in this manner is detection processing for the auto focus control of the image plane phase difference system.

The image capturing element 22 supplies a captured image signal of the captured image formed of the pixel signals output from the image capturing pixels and the phase difference detection signals output from the phase difference detection pixels to the AFE unit 23.

The AFE unit 23 performs A/D (Analog/Digital) conversion or the like on the phase difference detection signals supplied from the image capturing element 22 and supplies the converted phase difference detection signals to the image capturing element controller 32 via the signal processor 24 and the main controller 26. Further, the AFE unit 23 performs A/D conversion or the like on the captured image supplied from the image capturing element 22 and supplies the converted captured image to the signal processor 24.

The signal processor 24 supplies various types of signal processing such as demosaicing and gamma correction on the captured image supplied from the AFE unit 23 and supplies the processed captured image to the main controller 26. The operation unit 25 is formed of, for example, a button, a touch panel, and the like and supplies a signal corresponding to an operation of the user to the main controller 26.

The main controller 26 controls an operation of the entire image capturing apparatus 11 corresponding to a signal supplied from the operation unit 25. For example, the main controller 26 supplies the captured image supplied from the signal processor 24 to the contrast detector 30 and supplies the captured image to the recording unit 27 and the display unit 28. Further, the main controller 26 reads out the captured image from the recording unit 27 and supplies the read-out captured image to the image output unit 29.

The recording unit 27 uses, for example, a removable recording medium removable from the image capturing apparatus 11. The recording unit 27 records the captured image supplied from the main controller 26 and supplies the recorded captured image to the main controller 26.

The display unit 28 is, for example, a liquid crystal display panel and displays the captured image supplied from the main controller 26. The image output unit 29 outputs the captured image supplied from the main controller 26 to an external apparatus in a wireless or wired manner.

The contrast detector 30 calculates, based on the captured image supplied from the main controller 26, an evaluation value indicating a contrast degree of each region of the captured image and supplies the evaluation value to the contrast AF lens target position calculating unit 31.

The contrast AF lens target position calculating unit 31 calculates, based on the evaluation value supplied from the contrast detector 30, a target position indicating a position of the focus lens 53 focused on the subject in a predetermined region of the captured image and supplies the target position to AF system selector 36.

The target position of the focus lens 53 that is obtained in the contrast AF lens target position calculating unit 31 is a position of a destination of the focus lens 53 that is calculated by the contrast system. Note that, although an example in which the target position is calculated will be described, information indicating a direction of movement and a movement distance from the position of the focus lens 53 to the target position at the current point of time may be calculated as information for the auto focus control of the contrast system and the image plane phase difference system.

Further, the contrast AF lens target position calculating unit 31 calculates, according to an instruction of the AF system selector 36, an amplitude for finely vibrating the focus lens 53 in the detection for obtaining a contrast evaluation value, that is, a wobbling amount and supplies the amplitude to the AF system selector 36.

The image capturing element controller 32 calculates a reliability with respect to the phase difference detection signals supplied from the main controller 26 and supplies only phase difference detection signals having a high reliability to the defocus amount calculating unit 33. This can suppress error detection of the defocus amount in the image plane phase difference system.

The defocus amount calculating unit 33 calculates, based on the phase difference detection signals supplied from the image capturing element controller 32, a defocus amount for each AF calculation region and supplies the defocus amount to the focused region determining unit 34. The defocus amount calculated with respect to each AF calculation region is a deviation amount of an image plane of the image capturing lens 21 at the current point of time to a predetermined focal plane that is the image plane of the image capturing lens 21 when the focus is achieved on the subject in the region of the captured image that corresponds to the AF calculation region.

Based on the defocus amount of each AF calculation region supplied from the defocus amount calculating unit 33, the focused region determining unit 34 selects (determines) an AF calculation region that is a target on which the focus is to be achieved among the AF calculation regions, as the focus target region. The focused region determining unit 34 supplies the defocus amount of the focus target region to the image plane phase difference AF lens target position calculating unit 35 and the AF system selector 36.

Based on the defocus amount supplied from the focused region determining unit 34, the image plane phase difference AF lens target position calculating unit 35 calculates a target position indicating a position of the focus lens 53 when it is focused on the subject in the focus target region and supplies the target position to the AF system selector 36. When the target position of the focus lens 53 obtained by the image plane phase difference AF lens target position calculating unit 35 is the position of the destination of the focus lens 53 that is calculated by the image plane phase difference system.

The AF system selector 36 performs threshold processing on the defocus amount supplied from the focused region determining unit 34, to thereby select which of the contrast system and the image plane phase difference system is to be employed as the auto focus system. That is, based on a detection result of the image plane phase difference system, the AF system selector 36 performs an auto focus control while appropriately switching between the contrast system and the image plane phase difference system.

The AF system selector 36 supplies the calculated target position to the lens driver 37 by the selected auto focus system to cause the lens driver 37 to perform a focus operation. Further, the AF system selector 36 instructs the contrast AF lens target position calculating unit 31 to calculate a wobbling amount according to the selected auto focus system and supplies the wobbling amount supplied from the contrast AF lens target position calculating unit 31 to the lens driver 37.

Based on the target position supplied from the AF system selector 36, the lens driver 37 drives the focus lens driving motor 56 to move the focus lens 53 to the target position. At this time, based on the wobbling amount supplied from the AF system selector 36, the lens driver 37 drives the focus lens driving motor 56 to add fine vibrations to the focus lens 53. That is, the focus lens 53 is finely vibrated by a predetermined wobbling amount.

<Explanation of Image Capturing>

Next, an operation of the image capturing apparatus 11 will be described.

For example, when the user instructs to capture a captured image by operating the operation unit 25, the image capturing apparatus 11 starts image capturing that is processing of capturing the captured image according to the operation of the user. Note that the captured image may be a still image or may be a moving image though the description will be continued by exemplifying a case of capturing a moving image as the captured image.

Figure 2:
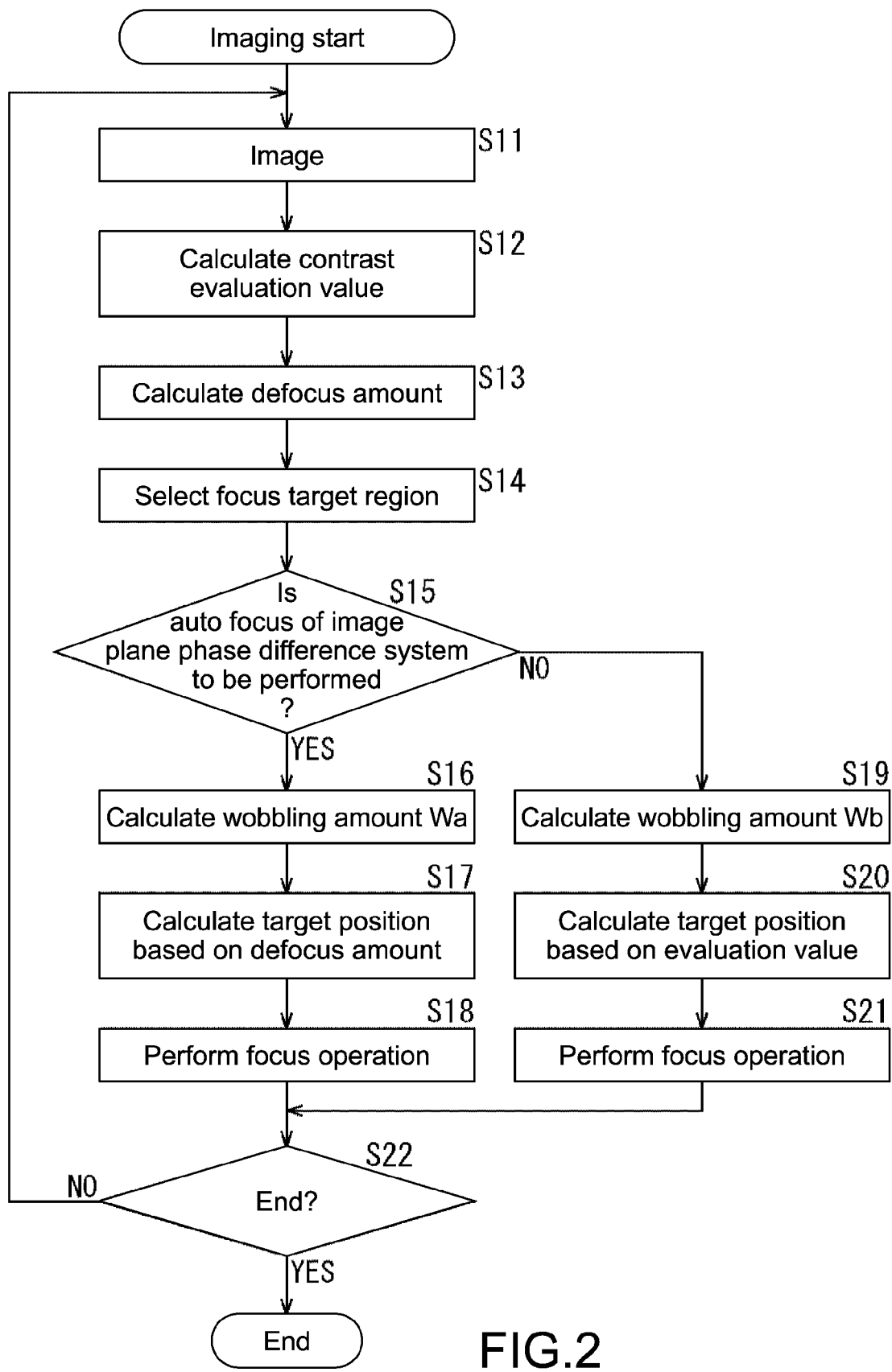
FIG. 2 is a flowchart for explaining image capturing.

Hereinafter, referring to a flowchart of FIG. 2, image capturing by the image capturing apparatus 11 will be described.

In Step S11, the image capturing element 22 receives light, which is input from the subject through the image capturing lens 21, and photoelectrically converts the light, to thereby image the subject.

That is, the image capturing element 22 supplies a captured image signal formed of pixel signals obtained by the image capturing pixels photoelectrically converting the light input from the subject, to the main controller 26 via the AFE unit 23 and the signal processor 24. At this time, the AFE unit 23 performs A/D conversion or the like on the captured image signal supplied from the image capturing element 22 and the signal processor 24 subjects the captured image signal supplied from the AFE unit 23 to signal processing such as demosaicing and gamma correction.

The main controller 26 supplies the captured image signal supplied from the signal processor 24 to the recording unit 27 for recording the captured image signal or supplies the captured image signal to the display unit 28 for displaying the captured image. The main controller 26 also supplies the captured image signal to the contrast detector 30.

Further, the phase difference detection pixels of the image capturing element 22 supply phase difference detection signals obtained by photoelectrically converting the light input from the subject, to the image capturing element controller 32 via the AFE unit 23, the signal processor 24, and the main controller 26. At this time, the AFE unit 23 performs A/D conversion or the like on the phase difference detection signals supplied from the image capturing element 22.

In addition, based on the phase difference detection signals supplied from the main controller 26, the image capturing element controller 32 calculates a reliability of the phase difference detection signals and supplies only phase difference detection signals whose reliability is above a predetermined value to the defocus amount calculating unit 33 at the subsequent stage. For example, if signals substantial as the phase difference detection signals, that is, useful signals are not obtained, the reliability is set to be lower.

In Step S12, based on the captured image signal supplied from the main controller 26, the contrast detector 30 calculates a contrast evaluation value of each region of the captured image and supplies the resulting contrast evaluation values to the contrast AF lens target position calculating unit 31.

For example, the contrast detector 30 calculates, with respect to each region of the captured image, a luminance of each pixel in the region and extracts high frequency components of each region based on the obtained luminance value. Then, based on the high frequency components extracted by each region of the captured image, the contrast detector 30 calculates a contrast degree of each region, that is, an evaluation value indicating a focusing degree.

Here, the calculated evaluation value is set to be larger as the contrast in a region set as a calculation target of the captured image becomes higher, that is, as edge components (high frequency components) included in the region increase. Thus, the region having a higher evaluation value is a focused region.

In Step S13, the defocus amount calculating unit 33 calculates, based on the phase difference detection signals supplied from the image capturing element controller 32, a defocus amount for each AF calculation region and supplies the defocus amount to the focused region determining unit 34. That is, the defocus amount calculating unit 33 detects, with respect to each AF calculation region, a distance between images of the subject in the image capturing surface, which is indicated by the phase difference detection signals, as a phase difference and calculates a defocus amount based on the phase difference.

In Step S14, the focused region determining unit 34 selects, based on the defocus amount of each AF calculation region that is supplied from the defocus amount calculating unit 33, one of the AF calculation regions as the focus target region. Then, the focused region determining unit 34 supplies the defocus amount of the focus target region to the image plane phase difference AF lens target position calculating unit 35 and the AF system selector 36.

For example, the focused region determining unit 34 selects the AF calculation region having a smallest defocus amount among the AF calculation regions as the focus target region. At this time, the focused region determining unit 34 adds weights to the AF calculation regions such that a larger weight is added to the AF calculation region whose subject is closer to the center of the image capturing surface of the image capturing element 22 and is closer to the image capturing apparatus 11, and selects (determines) the focus target region based on the defocus amount.

Note that the order for performing processing of Step S13 and processing of Steps S14 and S15 may be inverse.

In Step S15, the AF system selector 36 judges, based on the defocus amount of the focus target region supplied from the focused region determining unit 34, whether or not to perform auto focus of the image plane phase difference system.

For example, if the absolute value of the defocus amount of the focus target region is larger than a threshold set in advance, it is judged that the auto focus of the image plane phase difference system is to be performed. That is because, if the defocus amount is small, the focusing accuracy in the auto focus control of the image plane phase difference system is not sufficiently high.

If it is judged in Step S15 that the auto focus of the image plane phase difference system is to be performed, then processing of Steps S16 to S18 is performed and the auto focus control of the image plane phase difference system is performed.

At this time, the AF system selector 36 instructs the image plane phase difference AF lens target position calculating unit 35 to calculate the target position. Further, the AF system selector 36 instructs the contrast AF lens target position calculating unit 31 to calculate a wobbling amount Wa for detection of the contrast system in the case where the auto focus control of the image plane phase difference system is performed.

In Step S16, the contrast AF lens target position calculating unit 31 calculates a wobbling amount Wa according to the instruction of the AF system selector 36 and supplies the wobbling amount Wa to the AF system selector 36.

Here, the wobbling amount Wa for detection of the contrast system in the case where the auto focus control of the image plane phase difference system is performed is set to be surely smaller than a wobbling amount Wb for detection of the contrast system in the case where the auto focus control of the contrast system is performed. That is, the setting is made such that $0<Wa<Wb$ is established.

Specifically, for example, the contrast AF lens target position calculating unit 31 calculates a depth of field in image capturing of the captured image based on a position of the focus lens 53 in the optical axis direction, an aperture value of the diaphragm 52, a position of the zoom lens 54 in the optical axis direction, a size of the image capturing pixels of the image capturing element 22, and the like.

Then, the contrast AF lens target position calculating unit 31 calculates the wobbling amount Wa based on the calculated depth of field. Specifically, for example, a half value of the depth of field is set as the wobbling amount Wb and a half value of the wobbling amount Wb is set as the wobbling amount Wa. In this manner, if the wobbling amount is changed according to the depth of field, vibration or the like of the captured image due to wobbling can be made less outstanding.

Note that the wobbling amount may be variable according to the depth of field or the like or may be fixed by setting the values of the wobbling amount Wa and the wobbling amount Wb in advance. Further, the wobbling amount may be variable according to the speed for moving the focus lens 53 or the like.

In Step S17, the image plane phase difference AF lens target position calculating unit 35 calculates, based on the defocus amount supplied from the focused region determining unit 34, a target position of the focus lens 53 for focusing on the subject in the focus target region and supplies the target position to the AF system selector 36.

The AF system selector 36 supplies the target position supplied from the image plane phase difference AF lens target position calculating unit 35 and the wobbling amount Wa supplied from the contrast AF lens target position calculating unit 31 to the lens driver 37 and instructs the lens driver 37 to perform a focus operation.

In Step S18, the lens driver 37 performs a focus operation based on the target position and wobbling amount Wa supplied from the AF system selector 36.

That is, the lens driver 37 drives the focus lens driving motor 56 to move the focus lens 53 to the target position and drives the focus lens driving motor 56 to periodically finely vibrate the focus lens 53 by a width indicated by the wobbling amount Wa.

When processing of Step S18 is performed, then processing proceeds to Step S22.

If it is judged in Step S15 that the auto focus control of the image plane phase difference system is not to be performed, processing of Steps S19 to S21 is performed and the auto focus control of the contrast system is performed.

At this time, the AF system selector 36 instructs the contrast AF lens target position calculating unit 31 to calculate the target position and calculate the wobbling amount Wb for detection of the contrast system in the case of performing the auto focus control of the contrast system.

In Step S19, the contrast AF lens target position calculating unit 31 calculates a wobbling amount Wb according to the instruction of the AF system selector 36 and supplies the wobbling amount Wb to the AF system selector 36. For example, as in Step S16, the wobbling amount Wb is calculated based on the depth of field.

In Step S20, the contrast AF lens target position calculating unit 31 calculates, based on the evaluation value supplied from the contrast detector 30, a target position indicating the position of the destination of the focus lens 53 and supplies the target position to the AF system selector 36.

Specifically, the contrast AF lens target position calculating unit 31 selects a predetermined region of the captured image as a focus target region. For example, the focus target region may be a region including the focus target region determined by the focused region determining unit 34 or may be a region whose contrast evaluation value is highest. Further, in selecting the focus target region, weighting may be performed according to a region set as a focus target in a frame just before the captured image or the focus target region of the current frame that is determined by the focused region determining unit 34.

With respect to the focus target region, the contrast AF lens target position calculating unit 31 calculates, based on the evaluation value supplied from the contrast detector 30, a target position of the focus lens 53 for focusing on the subject in the focus target region.

That is, wobbling of the focus lens 53 is performed in the image capturing lens 21, and hence the contrast evaluation value is obtained with respect to each position in a width range in the optical axis direction indicated by the wobbling amount. Thus, in the contrast AF lens target position calculating unit 31, obtained is a slope value of the evaluation value indicating a change in the contrast evaluation value when the focus lens 53 is moved in the optical axis direction by a small amount.

The contrast AF lens target position calculating unit 31 calculates, based on the slope value of the contrast evaluation value in the focus target region, a target position such that the focus lens 53 is moved in a direction in which the contrast evaluation value is increased. For example, the slope value becomes smaller near the focus position, that is, a peak value of the contrast evaluation value, and hence a distance by which the focus lens 53 is moved is set to be shorter as the slope value becomes smaller.

In this manner, in the auto focus control of the contrast system, the focus adjustment is performed by searching for the position of the focus lens 53 for increasing the contrast of the captured image.

For example, in the case where wobbling is not performed, also after the focus lens 53 is moved based on the evaluation value of the contrast that is a detection value of the contrast system and the position of the focus lens 53 at which the evaluation value becomes a peak, it is necessary to further move the focus lens 53 from the peak position. That is because, unless the focus lens 53 is moved to a position at which the evaluation value is made smaller in some degree, it is not possible to judge a correct direction of movement (target position) for focusing on the subject.

In contrast, the wobbling motion is performed in the image capturing apparatus 11, and hence the slope value of the contrast evaluation value can be obtained. That is, the slope of the evaluation value that is a detection value can be known. Thus, it is possible to specify, based on this slope value, a correct direction in which the focus lens 53 should be moved, and to gradually move the focus lens 53 in this direction. In particular, near the peak of the evaluation value, the slope value becomes smaller as it approaches the peak, and hence it is easy to specify the direction in which the focus lens 53 should be moved.

The contrast AF lens target position calculating unit 31 calculates a target position of the focus lens 53 and then supplies the obtained target position to the AF system selector 36.

Further, the AF system selector 36 supplies the target position and wobbling amount Wb supplied from the contrast AF lens target position calculating unit 31 to the lens driver 37 and instructs the lens driver 37 to perform a focus operation.

In Step S21, the lens driver 37 performs a focus operation based on the target position and wobbling amount Wb supplied from the AF system selector 36.

That is, the lens driver 37 drives the focus lens driving motor 56 to move the focus lens 53 to the target position and drives the focus lens driving motor 56 to periodically finely vibrate the focus lens 53 by a width indicated by the wobbling amount Wb.

When processing of Step S21 is performed, then processing proceeds to Step S22.

When the focus operation is performed in Step S18 or S21, then the main controller 26 judges whether or not processing is to be terminated in Step S22. For example, when the user operates the operation unit 25 and instructs to terminate image capturing, it is judged that processing is to be terminated.

If it is judged in Step S22 that processing is not to be terminated, processing returns to Step S11 and the above-mentioned processes are performed again.

In contrast, it is judged in Step S22 that processing is to be terminated, the respective sections of the image capturing apparatus 11 terminate processing for capturing the captured image and image capturing ends.

In the above-mentioned manner, while continuously performing the image plane phase difference system and the detection of the contrast system at the same time in capturing the captured image, the image capturing apparatus 11 selects either one of the two auto focus systems and performs an actual focus operation.

At this time, in the case of achieving the focus by the image plane phase difference system, the image capturing apparatus 11 sets the wobbling amount for detection of the contrast system to be smaller than that in the case of achieving the focus by the contrast system.

With this, the change in the defocus amount obtained in detection of the image plane phase difference system becomes smaller, and the focusing accuracy of the image plane phase difference system can be improved. As a result, a better-focused high-quality image can be provided. Further, it is possible to suppress the deterioration of the image quality due to wobbling and further improve the image quality.

Note that, in the above description, in image capturing, while the detection of the contrast system, that is, the calculation of the contrast evaluation value and the detection of the image plane phase difference system, that is, the calculation of the defocus amount are being performed at the same time, either one of the auto focus systems is selected and the target position of the focus lens 53 by the selected system is calculated.

However, the present technology is not limited to this example. Alternatively, a target position of the contrast system and a target position of the image plane phase difference system may be calculated in advance and, based on a selection result of the auto focus system, the AF system selector 36 may selectively output the selected target position of the auto focus system to the lens driver 37.

Although the example in which the entire focus lens 53 formed of one or more lenses is finely vibrated (wobbled) has been described above, some of the lenses forming the focus lens 53 may be finely vibrated. Alternatively, all or some of the lenses of the image capturing lens 21 may be finely vibrated.

In addition, the calculation of the evaluation value of the contrast (Step S12) may be performed after the "Yes" result is obtained in Step S15.

By the way, the above-mentioned series of processing may be executed by hardware or may be executed by software. If the series of processing is executed by software, a program configuring the software is installed in a computer. Here, the computer includes a computer incorporated in dedicated hardware and a general computer capable of executing various functions by installing various programs, for example.

Figure 3:
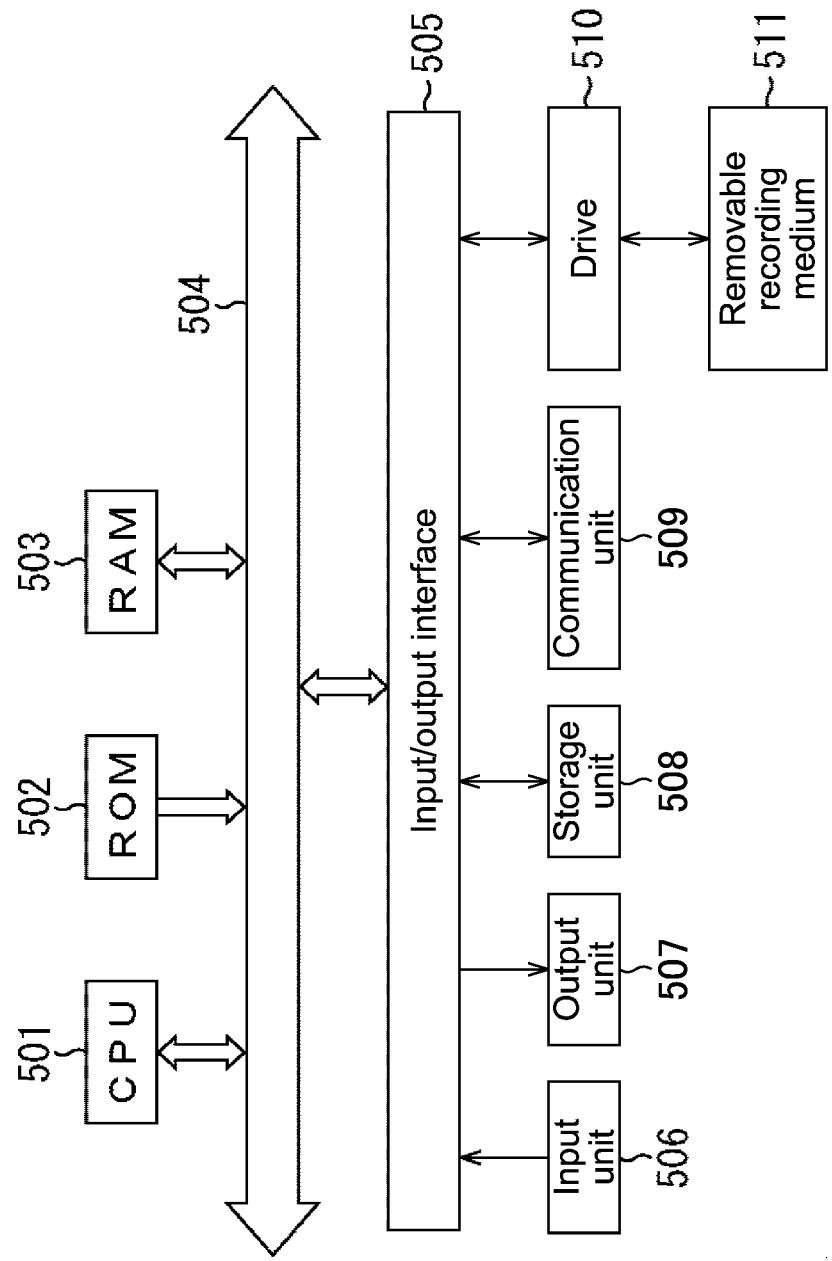
FIG. 3 is a view showing a configuration example of a computer.

FIG. 3 is a block diagram showing a configuration example of hardware of a computer that executes the above-mentioned series of processing according to a program.

In the computer, a CPU (Central Processing Unit) 501, a ROM (Read Only Memory) 502, and a RAM (Random Access Memory) 503 are connected to one another via a bus 504.

An input/output interface 505 is further connected to the bus 504. To the input/output interface 505, connected are an input unit 506, an output unit 507, a storage unit 508, a communication unit 509, and a drive 510.

The input unit 506 includes a keyboard, a mouse, a microphone, an image capturing element, and the like. The output unit 507 includes a display, a speaker, and the like. The storage unit 508 includes a hard disk, a non-volatile memory, and the like. The communication unit 509 includes a network interface and the like. The drive 510 drives a removable recording medium 511 such as a magnetic disc, an optical disc, a magneto-optical disc, and a semiconductor memory.

In the thus configured computer, the above-mentioned series of processing is performed by the CPU 501 loading a program, which is stored in, for example, the storage unit 508, to the RAM 503 via the input/output interface 505 and the bus 504 and executing the program.

The program executed by the computer (CPU 501) can be stored in the removable recording medium 511 as, for example, a package medium and provided. Alternatively, the program can be provided via a wired or wireless transmission medium such as a local area network, the Internet, and digital satellite broadcasting.

In the computer, the removable recording medium 511 is mounted to the drive 510 and thus the program can be installed in the storage unit 508 via the input/output interface 505. Alternatively, the program can be received by the communication unit 509 via the wired or wireless transmission medium and installed in the storage unit 508. Otherwise, the program can be installed in the ROM 502 or the storage unit 508 in advance.

Note that the program executed by the computer may be a program in which processes are performed in time series in the order described herein or may be a program in which processes are performed in parallel or at a necessary timing such as a call timing.

Embodiments of the present technology are not limited to the above-mentioned embodiments and various modifications can be made without departing from the gist of the present technology.

For example, the present technology may take a cloud computing configuration in which a single function is shared and cooperatively processed by a plurality of apparatuses over a network.

The steps described above with reference to the flowchart can be executed by a single apparatus and can also be shared and executed by a plurality of apparatuses.

In addition, if a single step includes a plurality of processes, the plurality of processes included in the single step can be executed by a single apparatus and can also be shared and executed by a plurality of apparatuses.

Further, the effects described herein are merely examples and not limited and other effects may be provided.

In addition, the present technology may also take the following configurations:

(1) An image capturing apparatus, including:
  a system selector configured to select either one of a focus control of a contrast system in which a wobbling motion is performed for detection and a focus control of a different system that is different from the focus control of the contrast system; and
  a controller configured to set a first wobbling amount for the focus control of the different system to be smaller than a second wobbling amount for the focus control of the contrast system.

(2) The image capturing apparatus according to (1), in which the focus control of the different system needs no wobbling motion for detection.

(3) The image capturing apparatus according to (1) or (2), in which the focus control of the different system is a focus control of a phase difference system.

(4) The image capturing apparatus according to any one of (1) to (3), in which the selector is configured to select, based on a result of detection for the focus control of the phase difference system, either one of the focus control of the contrast system and the focus control of the phase difference system.

(5) The image capturing apparatus according to any one of (1) to (4), in which the selector is configured to perform the focus control of the phase difference system if a defocus amount as the result of detection is larger than a threshold.

(6) The image capturing apparatus according to any one of (1) to (5), in which the controller is configured to calculate the first wobbling amount and the second wobbling amount such that the first wobbling amount is smaller than the second wobbling amount.

(7) The image capturing apparatus according to any one of (1) to (5), in which the first wobbling amount and the second wobbling amount take values set in advance.

(8) The image capturing apparatus according to any one of (3) to (7), in which the focus control of the phase difference system is a focus control of an image plane phase difference system.

(9) A method of controlling an image capturing apparatus, including the steps of: selecting either one of a focus control of a contrast system in which a wobbling motion is performed for detection and a focus control of a different system that is different from the focus control of the contrast system; and setting a first wobbling amount for the focus control of the different system to be smaller than a second wobbling amount for the focus control of the contrast system.

(10) The method of controlling an image capturing apparatus according to (9), in which the focus control of the different system needs no wobbling motion for detection.

(11) The method of controlling an image capturing apparatus according to (9) or (10), in which the focus control of the different system is a focus control of a phase difference system.

(12) The method of controlling an image capturing apparatus according to any one of (9) to (11), in which the selecting step includes selecting, based on a result of detection for the focus control of the phase difference system, either one of the focus control of the contrast system and the focus control of the phase difference system.

(13) The method of controlling an image capturing apparatus according to any one of (9) to (12), in which the selecting step includes performing the focus control of the phase difference system if a defocus amount as the result of detection is larger than a threshold.

(14) The method of controlling an image capturing apparatus according to any one of (9) to (13), in which the setting step includes calculating the first wobbling amount and the second wobbling amount such that the first wobbling amount is smaller than the second wobbling amount.

(15) The method of controlling an image capturing apparatus according to any one of (9) to (13), in which the first wobbling amount and the second wobbling amount take values set in advance.

(16) The method of controlling an image capturing apparatus according to any one of (11) to (15), in which the focus control of the phase difference system is a focus control of an image plane phase difference system.

(17) A non-transitory computer readable medium storing a program causing a computer to execute a method of controlling an image capturing apparatus, the method including the steps of:
  selecting either one of a focus control of a contrast system in which a wobbling motion is performed for detection and a focus control of a different system that is different from the focus control of the contrast system; and
  setting a first wobbling amount for the focus control of the different system to be smaller than a second wobbling amount for the focus control of the contrast system.

(18) The non-transitory computer readable medium according to (17), in which the focus control of the different system needs no wobbling motion for detection.

(19) The non-transitory computer readable medium according to (17) or (18), in which the focus control of the different system is a focus control of a phase difference system.

(20) The non-transitory computer readable medium according to any one of (17) to (19), in which the selecting step includes selecting, based on a result of detection for the focus control of the phase difference system, either one of the focus control of the contrast system and the focus control of the phase difference system.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus, comprising:
a system selector configured to select either one of a focus control of a contrast system in which a wobbling motion is performed for detection and a focus control of a different system that is different from the focus control of the contrast system; and
a controller configured to set a first wobbling amount for the focus control of the different system to be smaller than a second wobbling amount for the focus control of the contrast system,
wherein the focus control of the different system is a focus control of a phase difference system, and
wherein the system selector is configured to select, based on a result of detection for the focus control of the phase difference system, either one of the focus control of the contrast system and the focus control of the phase difference system.

2. The image capturing apparatus according to claim 1, wherein the focus control of the different system needs no wobbling motion for detection.

3. The image capturing apparatus according to claim 1, wherein the system selector is configured to perform the focus control of the phase difference system if a defocus amount as the result of detection is larger than a threshold.

4. The image capturing apparatus according to claim 1, wherein the controller is configured to calculate the first wobbling amount and the second wobbling amount such that the first wobbling amount is smaller than the second wobbling amount.

5. The image capturing apparatus according to claim 1, wherein the first wobbling amount and the second wobbling amount take values set in advance.

6. The image capturing apparatus according to claim 1, wherein the focus control of the phase difference system is a focus control of an image plane phase difference system.

7. A method of controlling an image capturing apparatus, comprising the steps of:
selecting, by a system selector, either one of a focus control of a contrast system in which a wobbling motion is performed for detection and a focus control of a different system that is different from the focus control of the contrast system; and
setting, by a controller, a first wobbling amount for the focus control of the different system to be smaller than a second wobbling amount for the focus control of the contrast system,
wherein the focus control of the different system is a focus control of a phase difference system, and
wherein the selecting step includes selecting, based on a result of detection for the focus control of the phase difference system, either one of the focus control of the contrast system and the focus control of the phase difference system.

8. The method of controlling the image capturing apparatus according to claim 7, wherein the focus control of the different system needs no wobbling motion for detection.

9. The method of controlling the image capturing apparatus according to claim 7, wherein the selecting step includes performing the focus control of the phase difference system if a defocus amount as the result of detection is larger than a threshold.

10. The method of controlling the image capturing apparatus according to claim 7, wherein the setting step includes calculating the first wobbling amount and the second wobbling amount such that the first wobbling amount is smaller than the second wobbling amount.

11. The method of controlling the image capturing apparatus according to claim 7, wherein the first wobbling amount and the second wobbling amount take values set in advance.

12. The method of controlling the image capturing apparatus according to claim 7, wherein the focus control of the phase difference system is a focus control of an image plane phase difference system.

13. A non-transitory computer-readable medium storing a set of computer-executable instructions causing a computer to execute a method of controlling an image capturing apparatus, the method comprising the steps of:
selecting either one of a focus control of a contrast system in which a wobbling motion is performed for detection and a focus control of a different system that is different from the focus control of the contrast system; and
setting a first wobbling amount for the focus control of the different system to be smaller than a second wobbling amount for the focus control of the contrast system,
wherein the focus control of the different system is a focus control of a phase difference system, and
wherein the selecting step includes selecting, based on a result of detection for the focus control of the phase difference system, either one of the focus control of the contrast system and the focus control of the phase difference system.

14. The non-transitory computer-readable medium according to claim 13, wherein the focus control of the different system needs no wobbling motion for detection.

* * * * *